United States Patent [19]

Long

[11] Patent Number: 5,762,455
[45] Date of Patent: Jun. 9, 1998

[54] TENSION STRAP DEVICE

[76] Inventor: Noah D. Long, 2313 S. Joe Brown Hwy., Chadbourn, N.C. 28431

[21] Appl. No.: 664,560

[22] Filed: Jun. 17, 1996

[51] Int. Cl.[6] ............................................. B60P 7/08
[52] U.S. Cl. ............................ 410/100; 410/97; 24/68 CD
[58] Field of Search .......................... 410/100, 97, 50, 410/102, 103, 12, 96; 254/213, 223; 24/68 CD, 68 CR, 116 R, 302, 265 CD; 242/388.1; 248/499

[56] References Cited

U.S. PATENT DOCUMENTS

| | | | |
|---|---|---|---|
| D. 311,326 | 10/1990 | Nelson | D8/356 |
| 2,449,600 | 9/1948 | Geiger | 410/100 |
| 2,586,048 | 2/1952 | Hyatt | 254/223 X |
| 2,904,347 | 9/1959 | Tucker | 24/116 R X |
| 3,377,044 | 4/1968 | Jackson et al. | 410/96 |
| 3,611,710 | 10/1971 | Holma et al. | 24/116 R X |
| 4,083,312 | 4/1978 | Holman, Jr. | 410/97 |
| 4,257,570 | 3/1981 | Rasmussen | |
| 4,358,232 | 11/1982 | Griffith | 410/100 |
| 4,416,319 | 11/1983 | Hofmann | 24/116 R X |
| 4,818,162 | 4/1989 | Zukowski et al. | 410/116 |
| 4,823,443 | 4/1989 | Waters | 24/68 CD |
| 4,948,311 | 8/1990 | St. Pierre et al. | 410/107 |
| 5,230,295 | 7/1993 | Shell | |
| 5,351,372 | 10/1994 | Ihara | 24/68 CD X |
| 5,388,938 | 2/1995 | Helton | 410/101 |
| 5,423,644 | 6/1995 | First, Sr. | 410/100 |

Primary Examiner—Stephen Gordon

[57] ABSTRACT

A tension strap device for holding a load in place on a vehicle using nylon straps and winches with chain-based hold-down structures, as found, for example, inside semi-trailers such as flatbed trailers with sides. The device includes a tension winch, a tension strap, an end hook attachment, and a strap-to-chain adapter. A load is held in place on a hauling vehicle using the tension strap device. Existing load chains mounted on the bed of a vehicle for tying down loads, are connectable to the strap-to-chain adapter, which is connectable to the end hook attachment.

3 Claims, 5 Drawing Sheets

TENSION STRAP DEVICE

BACKGROUND OF THE INVENTION

1. Field of the Invention

The present invention relates to truck tie down straps and more particularly pertains to a new Tension Strap Device for enabling the use of nylon straps and winches inside a semi-trailer, specifically a flatbed trailer with sides and known as "covered wagons".

2. Description of the Prior Art

The use of truck tie down straps is known in the prior art. More specifically, truck tie down straps heretofore devised and utilized are known to consist basically of familiar, expected and obvious structural configurations, notwithstanding the myriad of designs encompassed by the crowded prior art which have been developed for the fulfillment of countless objectives and requirements.

Known prior art truck tie down straps include U.S. Pat. No. 4,948,311; U.S. Pat. No. 4,818,162; U.S. Pat. Des. No. 311,326; U.S. Pat. No. 4,257,570; U.S. Pat. No. 5,388,938, U.S. Pat. No. 4,823,443, U.S. Pat. No. 5,423,644, and U.S. Pat. No. 5,230,295.

While these devices fulfill their respective, particular objectives and requirements, the aforementioned patents do not disclose a new Tension Strap Device. The inventive device includes a tension winch, a tension strap, an end hook attachment, and a strap-to-chain adapter.

In these respects, the Tension Strap Device according to the present invention substantially departs from the conventional concepts and designs of the prior art, and in so doing provides an apparatus primarily developed for the purpose of enabling the use of nylon straps and winches inside a semi-trailer, specifically a flatbed trailer with sides and known as "covered wagons".

SUMMARY OF THE INVENTION

In view of the foregoing disadvantages inherent in the known types of truck tie down straps now present in the prior art, the present invention provides a new Tension Strap Device construction wherein the same can be utilized for enabling the use of nylon straps and winches inside a semi-trailer, specifically a flatbed trailer with sides and known as "covered wagons".

The general purpose of the present invention, which will be described subsequently in greater detail, is to provide a new Tension Strap Device apparatus and method which has many of the advantages of the truck tie down straps mentioned heretofore and many novel features that result in a new Tension Strap Device which is not anticipated, rendered obvious, suggested, or even implied by any of the prior art truck tie down straps, either alone or in any combination thereof.

To attain this, the present invention generally comprises a tension winch, a tension strap, an end hook attachment, and a strap-to-chain adapter.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Tension Strap Device apparatus and method which has many of the advantages of the truck tie down straps mentioned heretofore and many novel features that result in a new Tension Strap Device which is not anticipated, rendered obvious, suggested, or even implied by any of the prior art truck tie down straps, either alone or in any combination thereof.

It is another object of the present invention to provide a new Tension Strap Device which may be easily and efficiently manufactured and marketed.

It is a further object of the present invention to provide a new Tension Strap Device which is of a durable and reliable construction.

An even further object of the present invention is to provide a new Tension Strap Device which is susceptible of a low cost of manufacture with regard to both materials and labor, and which accordingly is then susceptible of low prices of sale to the consuming public, thereby making such Tension Strap Device economically available to the buying public.

Still yet another object of the present invention is to provide a new Tension Strap Device which provides in the apparatuses and methods of the prior art some of the advantages thereof, while simultaneously overcoming some of the disadvantages normally associated therewith.

Still another object of the present invention is to provide a new Tension Strap Device for enabling the use of nylon straps and winches inside a semi-trailer, specifically a flatbed trailer with sides and known as "covered wagons".

Yet another object of the present invention is to provide a new Tension Strap Device which includes a tension winch, a tension strap, an end hook attachment, and a strap-to-chain adapter.

Still yet another object of the present invention is to provide a new Tension Strap Device that will tie down loads on a flatbed trailer without causing damage to the load as a chain would.

Even still another object of the present invention is to provide a new Tension Strap Device that will allow tension straps to be used in conjunction with existing chain tie downs.

3

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
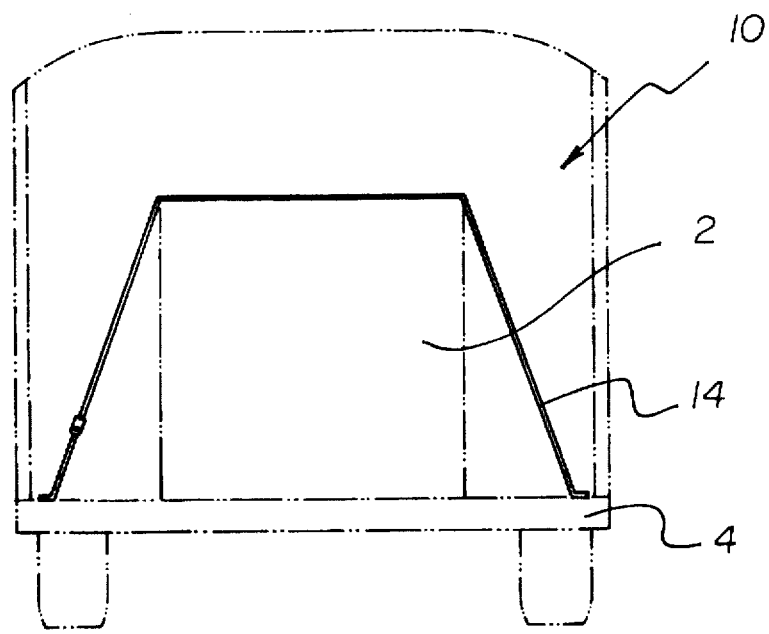
FIG. 1 is a rear elevation view of a new Tension Strap Device according to the present invention.
Figure 2:
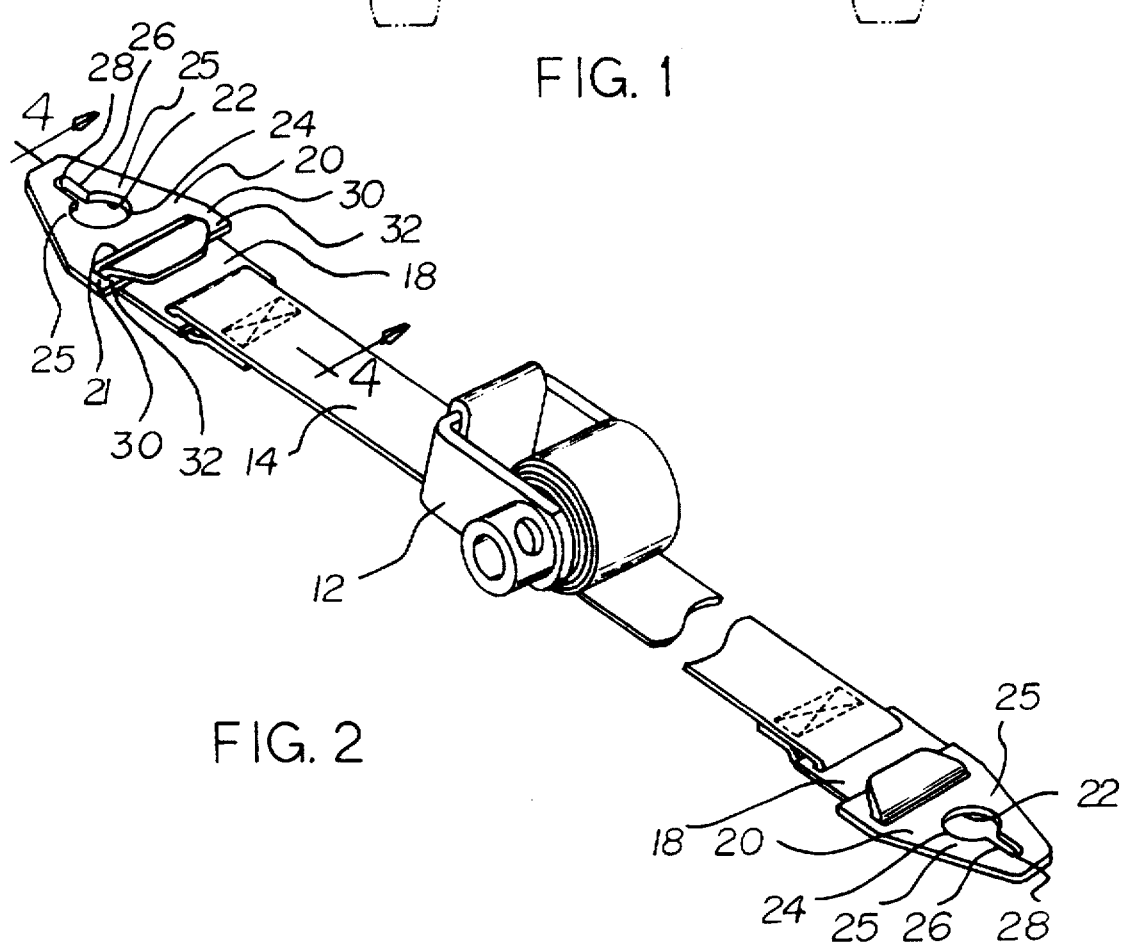
FIG. 2 is a top perspective view of a new Tension Strap Device according to the present invention.
Figure 3:
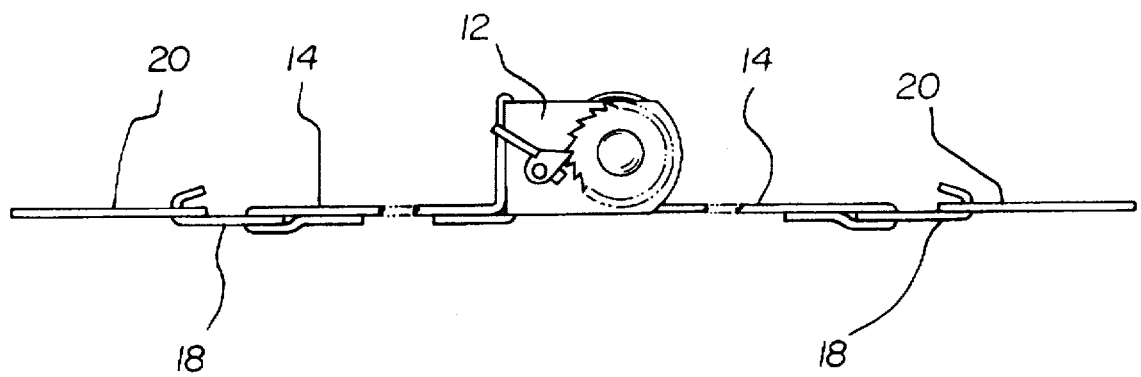
FIG. 3 is a side elevation view of the present invention.
Figure 4:
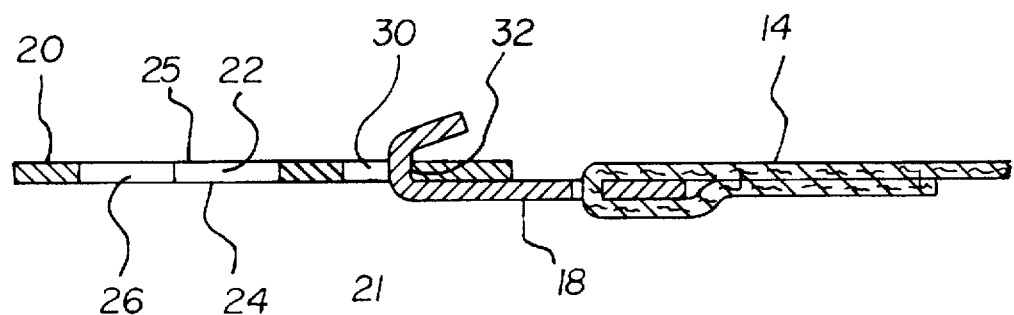
FIG. 4 is a cross sectional view taken along line 4—4 of FIG. 2.
Figure 4A:
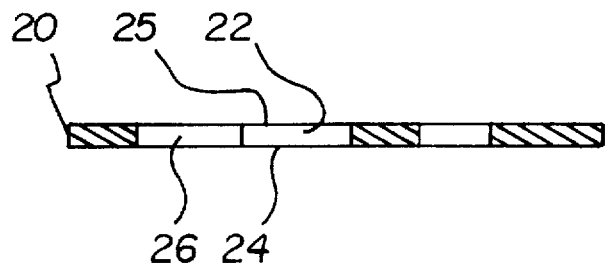
FIG. 4a is a cross sectional view of the strap-to-chain adapter alone according to the present invention as it would be taken along line 4—4 of FIG. 2.

With reference now to the drawings, and in particular to FIGS. 1 through 6 thereof, a new Tension Strap Device embodying the principles and concepts of the present invention and generally designated by the reference numeral 10 will be described.

More specifically, it will be noted that the Tension Strap Device 10 comprises a tension winch 12, a tension strap 14, an end hook attachment 18, and a strap-to-chain adapter 20.

As best illustrated in FIGS. 1 through 7, it can be shown that the tension strap 14 is of conventional design and consists of two strap pieces connected by the tension winch 12 and as typical, the two strap pieces are terminated at their distal ends by the end hook attachment 18. The end hook attachment 18 matingly engages the strap-to-chain adapter 20.

The strap-to-chain adapter 20 furthermore, also matingly engages a load chain 6. The load chain 6 is held to a hauling vehicle 4 by a load chain anchor 8. Additionally, without using the invention, the end hook attachment 18 of the tension strap 14, can directly engage an alternative "D-ring" 7 which would be existing and fastened to the hauling vehicle 4 by a "D-ring" anchor 9.

A load 2, which would ordinarily be damaged by holding it down with a load chain 6, therefore will be held down by a non-damaging tension strap 14.

The strap-to-chain adapter 20 is comprised of an end hook aperture 21, an arcuate edge wall 22, a circular aperture 24,

4 and an elongated aperture 26 where the end hook aperture 21 is further defined by a tension bar 30 at each end of the end hook aperture 21 and where the end hook aperture 21 is defined as being substantially rectangularly elongated. The tension strap 14 pulls against a buckle base edge 32 which is integrally connected to the elongated aperture 26 and further helps to define the end hook aperture 21.

The circular aperture 24 is further defined as a chain clearance hole and consists of the arcuate edge wall 22 which forms an inner circumference of the circular aperture 24. The circular aperture 24, being integrally contained in the strap-to-chain adapter 20, further defines the inner side of aperture bars 25 which structurally connect the elongated aperture 26 to the tension bar 30 and where the aperture bar 25 is wider and therefore stronger than the tension bar 30.

The elongated aperture 26 is in open communication with the circular aperture 24 and protrudes from the circular aperture 24 in a direction away from the tension winch 12 and further includes a chain retaining edge 28 which matingly and tensionally engages the load chain 6.

In use, referring to FIG. 1, a load 2 is held in place on a hauling vehicle 4 using the Tension Strap Device 10. Existing load chains 6 or "D-rings" 7 that are ordinarily used to tie down loads 2, are used only in portion in conjunction with the load chain anchors 8 and the "D-ring" anchors 9. The strap-to-chain adapter 20 is used to engage both the end hook attachment 18 and the existing load chains 6.

Figure 5A:
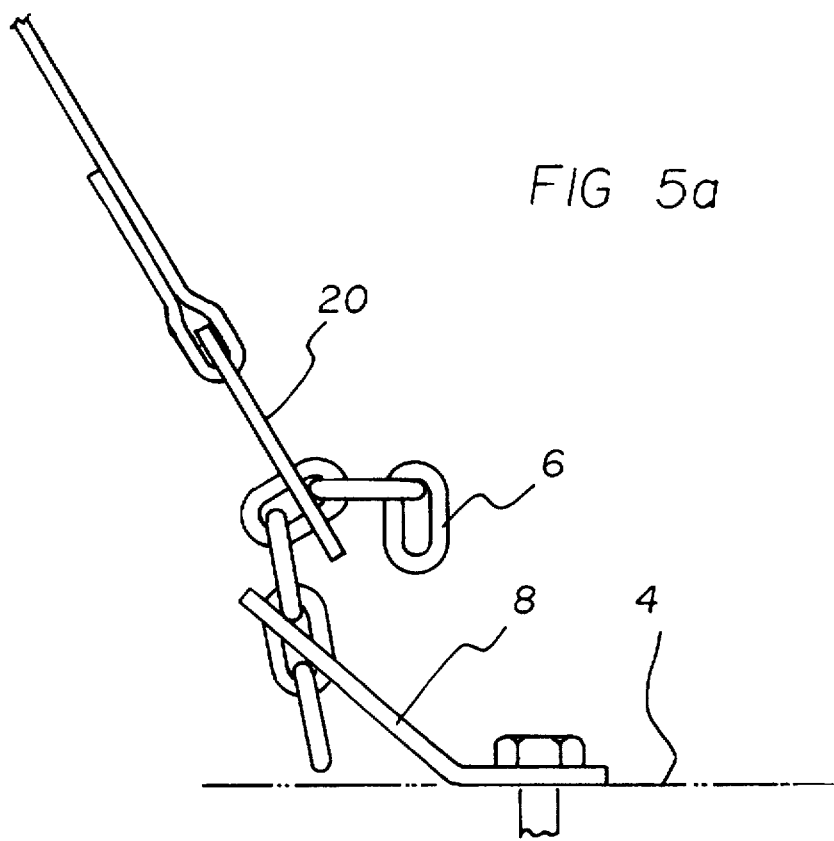
FIG. 5a is an enlarged detail view illustrating the present invention in an alternate use.
Figure 5:
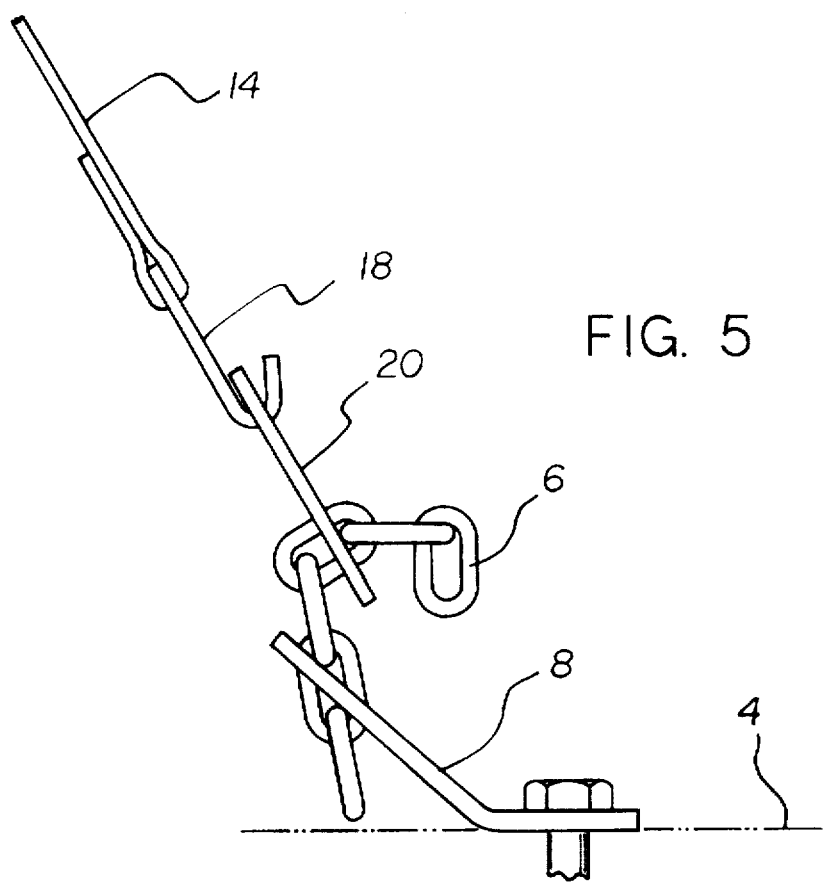
FIG. 5 is an enlarged detail view illustrating the present invention in use.
Figure 6:
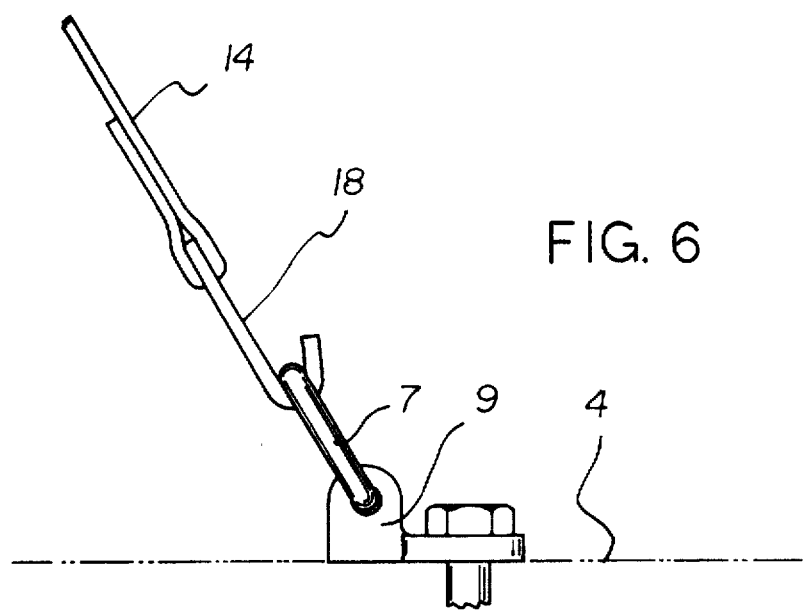
FIG. 6 is an enlarged detail view illustrating the present invention in an alternate use.
Figure 7:
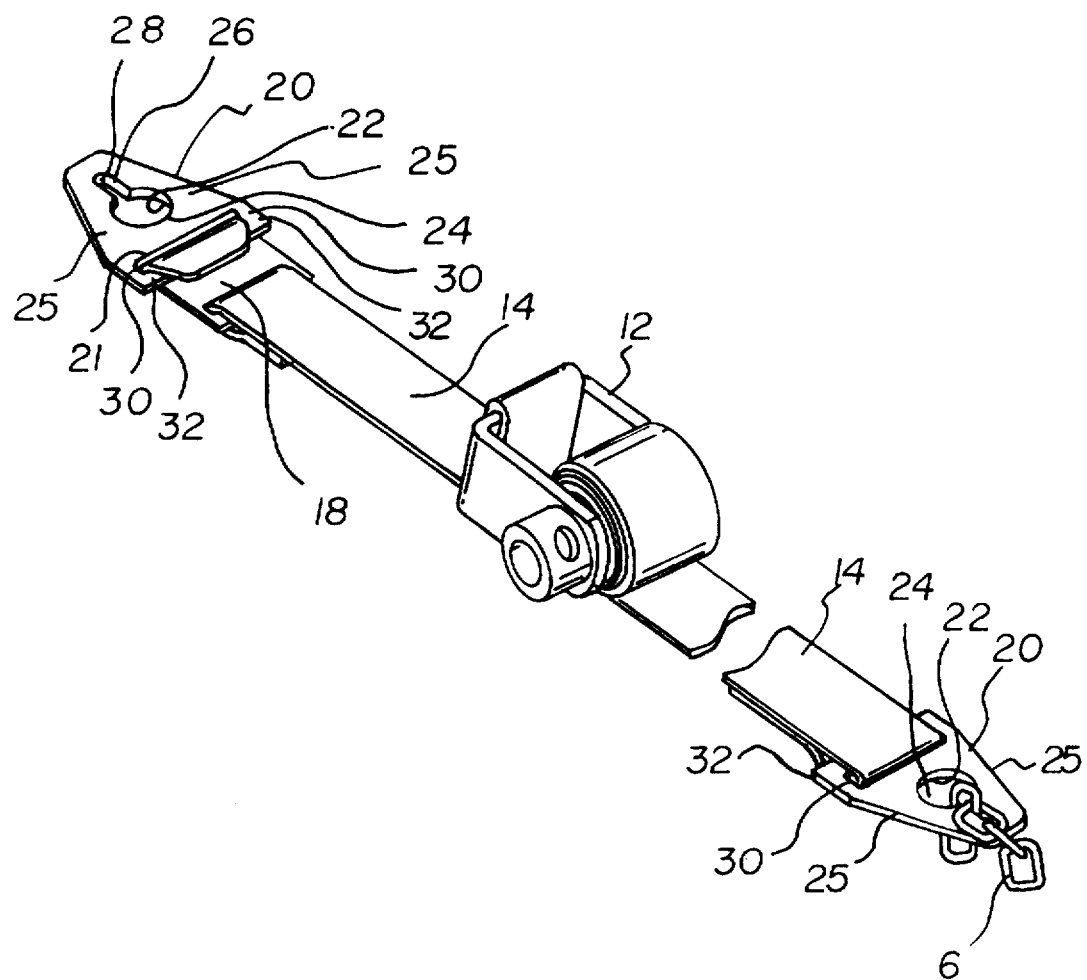
FIG. 7 is a top perspective view of another arrangement of the new Tension Strap Device according to the present invention.

The strap to chain adapter 20 may be directly mounted to a portion of a hold-down strap, as shown in FIGS. 5a, such that only the adapter 20 is located between the strap and the load chain 6 mounted on the surface of the hauling vehicle 4. Further, as shown in FIG. 7, one end of the tension strap 14 may be directly mounted to an adapter 20 and the other end of the tension strap 14 may have an end hook attachment 18 mounted thereto for removably hooking on another adapter 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tension strap device comprising:

a tension strap having opposite ends which define the effective length of said tension strap therebetween, a tension winch mounted on said tension strap for adjusting the effective length of said tension strap between the opposite ends, an end hook attachment fixedly mounted on each of the opposite ends of the tension strap, each said end hook attachment having a hook portion thereon, and a respective strap-to-chain adapter for mounting each said end hook attachment to a chain, each said strap-to-chain adapter comprising a substantially planar plate having a longitudinal axis and an outer perimeter, said plate including:

an elongate end hook aperture in said planar plate for receiving the hook portion of the respective end hook attachment, said end hook aperture comprising an elongate slot extending substantially transverse to said longitudinal axis and being closed to said outer perimeter to prevent slippage of said end hook attachment out of said respective end hook aperture, a chain aperture located in said planar plate and being closed to the outer perimeter of said planar plate, wherein said chain aperture has a substantially circular portion being substantially centered on said longitudinal axis in a spaced relationship to said end hook aperture and an elongate slot portion extending along said longitudinal axis in a direction away from said end hook aperture, wherein said substantially circular portion has a diameter sufficiently large to permit the links of a chain to pass therethrough, and wherein said slot portion is in communication with said substantially circular portion, said slot portion having a width dimension transverse to said longitudinal axis and a depth dimension parallel to said longitudinal axis.

2. The tension strap device of claim 1, wherein the tension strap comprises two pieces of strap with each piece being connected to the tension winch.

3. The tension strap device of claim 1 additionally comprising a load chain, wherein the load chain is received by the chain aperture of said strap-to-chain adapter.

* * * * *